United States Patent
Shetler et al.

(10) Patent No.: US 10,585,706 B2
(45) Date of Patent: Mar. 10, 2020

(54) SYSTEM AND METHOD FOR ALLOCATING MEMORY DEVICES AMONG INFORMATION HANDLING SYSTEMS IN A CHASSIS

(71) Applicant: DELL PRODUCTS, LP, Round Rock, TX (US)

(72) Inventors: Kurt W. Shetler, Round Rock, TX (US); Armando J. Martinez, Austin, TX (US); Zaid G. Sofia, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 64 days.

(21) Appl. No.: 15/620,592

(22) Filed: Jun. 12, 2017

(65) Prior Publication Data

US 2018/0357102 A1   Dec. 13, 2018

(51) Int. Cl.

| G06F 9/50 | (2006.01) |
|---|---|
| G06F 12/02 | (2006.01) |
| G06F 13/40 | (2006.01) |
| G06F 13/16 | (2006.01) |
| G06F 13/364 | (2006.01) |
| G06F 15/16 | (2006.01) |

(52) U.S. Cl.
CPC .......... *G06F 9/5016* (2013.01); *G06F 12/023* (2013.01); *G06F 13/161* (2013.01); *G06F 13/364* (2013.01); *G06F 13/4081* (2013.01); *G06F 15/16* (2013.01); *G06F 2212/1044* (2013.01)

(58) Field of Classification Search
CPC ..................................................... G06F 1/324
See application file for complete search history.

(56) References Cited

U.S. PATENT DOCUMENTS

| 9,229,892 | B2 | 1/2016 | Mandapuram et al. | |
| 2002/0062377 | A1* | 5/2002 | Hillman | H04L 29/06 709/227 |
| 2005/0262216 | A1* | 11/2005 | Kashiwabara | H04L 12/2803 709/208 |
| 2010/0036948 | A1* | 2/2010 | Cassiday | G06F 9/5061 709/225 |
| 2011/0131373 | A1* | 6/2011 | Kumar | G06F 11/2089 711/113 |
| 2015/0039871 | A1 | 2/2015 | Shetty et al. | |

* cited by examiner

*Primary Examiner* — Henry Tsai
*Assistant Examiner* — Juanito Borromeo
(74) *Attorney, Agent, or Firm* — Larson Newman, LLP

(57) ABSTRACT

A blade server includes two or more server blades where each server blade includes a server, and two or more memory devices. The server blades arbitrate among themselves to designate one of them as a master server blade. The master server blade allocates the memory devices.

20 Claims, 4 Drawing Sheets

SYSTEM AND METHOD FOR ALLOCATING MEMORY DEVICES AMONG INFORMATION HANDLING SYSTEMS IN A CHASSIS

FIELD OF THE DISCLOSURE

This disclosure generally relates to information handling systems, and more particularly relates to allocating memory devices among information handling systems in a chassis.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

An example of an information handling system is a server having access to multiple memory devices for data storage.

SUMMARY

A blade server may include two or more server blades and two or more memory devices. The server blades may arbitrate among themselves to designate one of them as a master server blade. The master server blade allocates the memory devices among the server blades for use as data storage.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
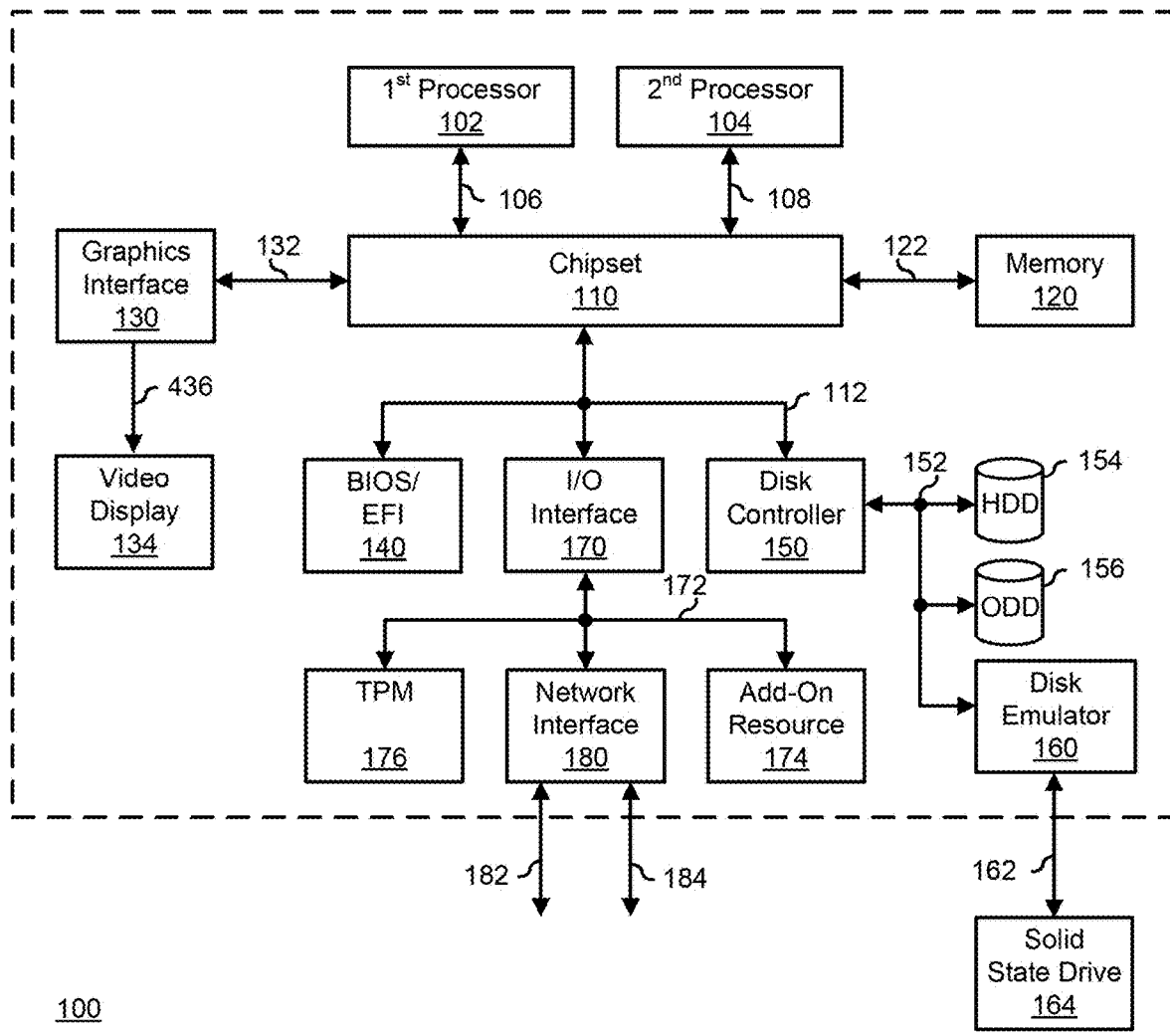
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a processor system which may be a System-on-a-Chip (SoC), a personal computer, a laptop computer, a smart phone, a tablet device or other consumer electronic device, storage array, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a SoC, or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

For the purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. An information handling system can include processing resources for executing machine-executable code, such as a central processing unit (CPU), a Programmable Logic Array (PLA), an embedded device such as a System-On-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various Input and Output (I/O) devices, such as a keyboard, a mouse, and a video display.

An example of an information handling system is a server. An example of a server may comprise a modular electronic circuit board with a CPU, baseboard management controller (BMC) and a storage controller, and such a modular server may be referred to as a server blade. A BMC is a specialized service processor that monitors the physical state of the server. A server blade provides server functionality and comprises processors, memory, integrated network controllers and input/output (I/O) ports. Server blades may be stored in a chassis comprising a backplane providing an interface for the server blades. The backplane may be a smart backplane with a CPU interfacing with server blades stored in the chassis. As such the backplane may be an information handling system. The backplane may provide an interface for one or more memory devices such as hard disk drives (HDDs) or solid state drives (SSDs), and these memory devices may also be stored in the chassis. The chassis comprising the backplane and storing the server blades may be a referred to as a blade server and may be an information handling system.

Figure 2:
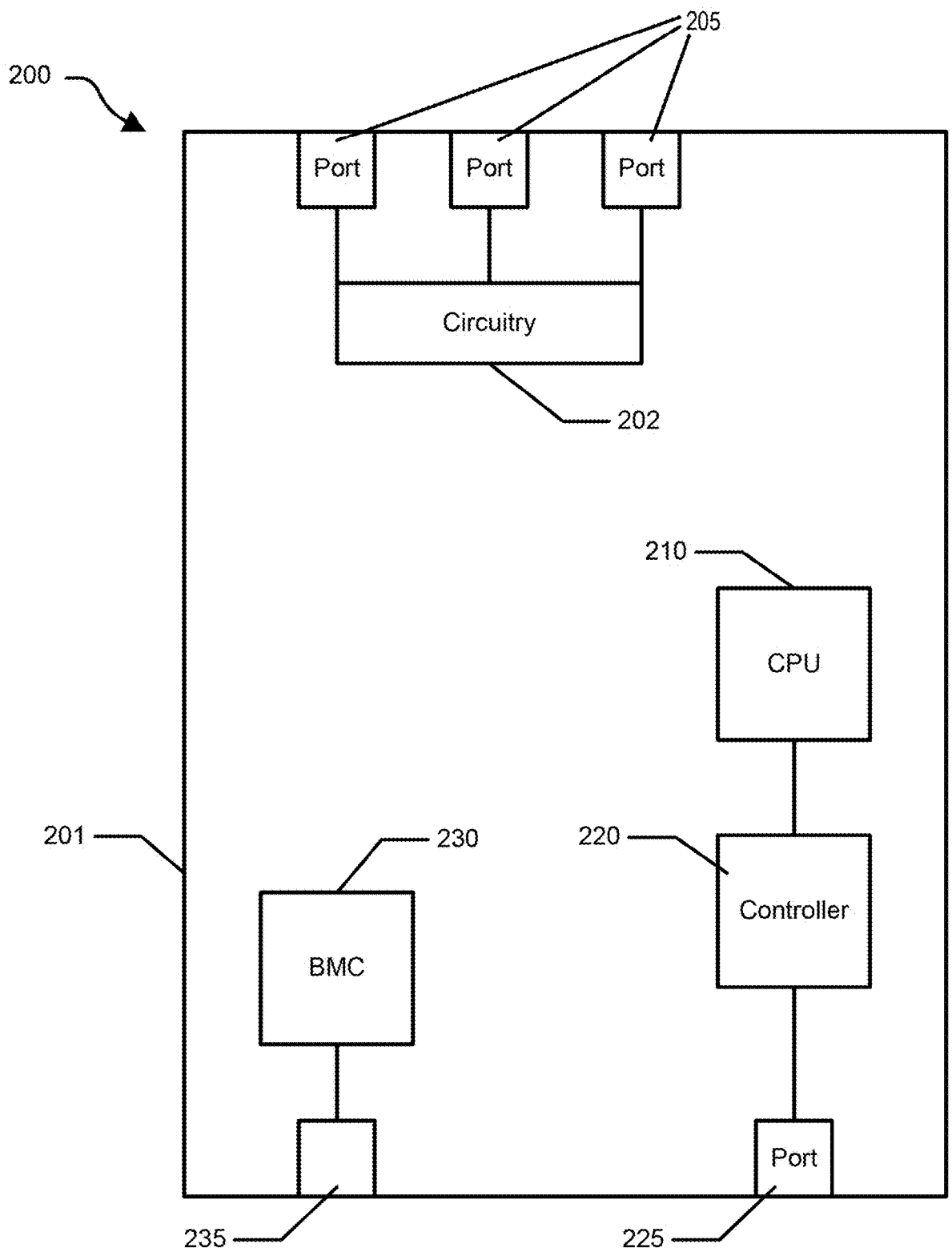
FIG. 2 illustrates an information handling system according to an embodiment of the present disclosure.

FIG. 2 shows an example server blade 200. Server blade 200 includes motherboard 201 which may be a modular electronic circuit board. Server blade 200 further includes server circuitry 202, server I/O ports 205, server CPU 210, storage controller 220, and BMC 230. Mounted on motherboard 201 is server circuitry 202 which is connected to server I/O ports 205 by one or more conductors which may be traces on motherboard 201, for example. Also mounted on motherboard 201 are server CPU 210 and storage controller 220. Server CPU 210 is connected to storage controller 220 by one or more conductors which may be traces on motherboard 201, for example. Storage controller 220 is connected to a port 225 by one or more conductors which may be traces on motherboard 201, for example. Port 225 may be a Serial Attached SCSI (SAS) port for interfacing with a backplane of a blade server. BMC 230 is also mounted on motherboard 201 and is connected to a connector 235 by one or more conductors which may be traces on motherboard 201, for example. Connector 235 may be an Inter-Integrated Circuit (IIC) connector for interfacing with a backplane of a blade server.

As discussed above, multiple server blades, such as server blade 200, may be stored in a physical chassis such as a blade server together with a set of memory devices such as HDDs or SSDs which provide data storage for the server blades. Internal to the blade server, the server blades and memory devices interface with a backplane of the blade server, and may interface with each other over the backplane internal to the blade server. The set of memory devices may be physically partitioned and allocated to the multiple server blades for use as data storage. The blade server and backplane of the blade server may be passive with regard to physically partitioning the memory devices across the blade servers. That is, the backplane and the blade server may lack the capability to partition and allocate the memory devices to the server blades, and thus the server blades may partition and allocate the memory devices among the server blades.

The server blades may arbitrate for control of partitioning and allocating memory devices to the server blades such that a single server blade of the server blades partitions and allocates memory devices among the server blades in a zoning procedure which allocates memory devices to individual server blades for use as data storage. For example, different server blades are allocated different individual memory devices such that an individual server blade has access to a set of memory devices for data storage by the individual server blade exclusive of the other server blades. A memory map stored in the backplane may be leveraged to allow the server blades to arbitrate among themselves to designate a temporary master server blade which performs a zoning procedure to allocate memory devices to individual server blades. The zoning procedure may be performed upon a reset or power cycle of the blade server such that the memory device allocation or zoning of the memory devices among the server blades is static during normal operation of the blade server.

Figure 3:
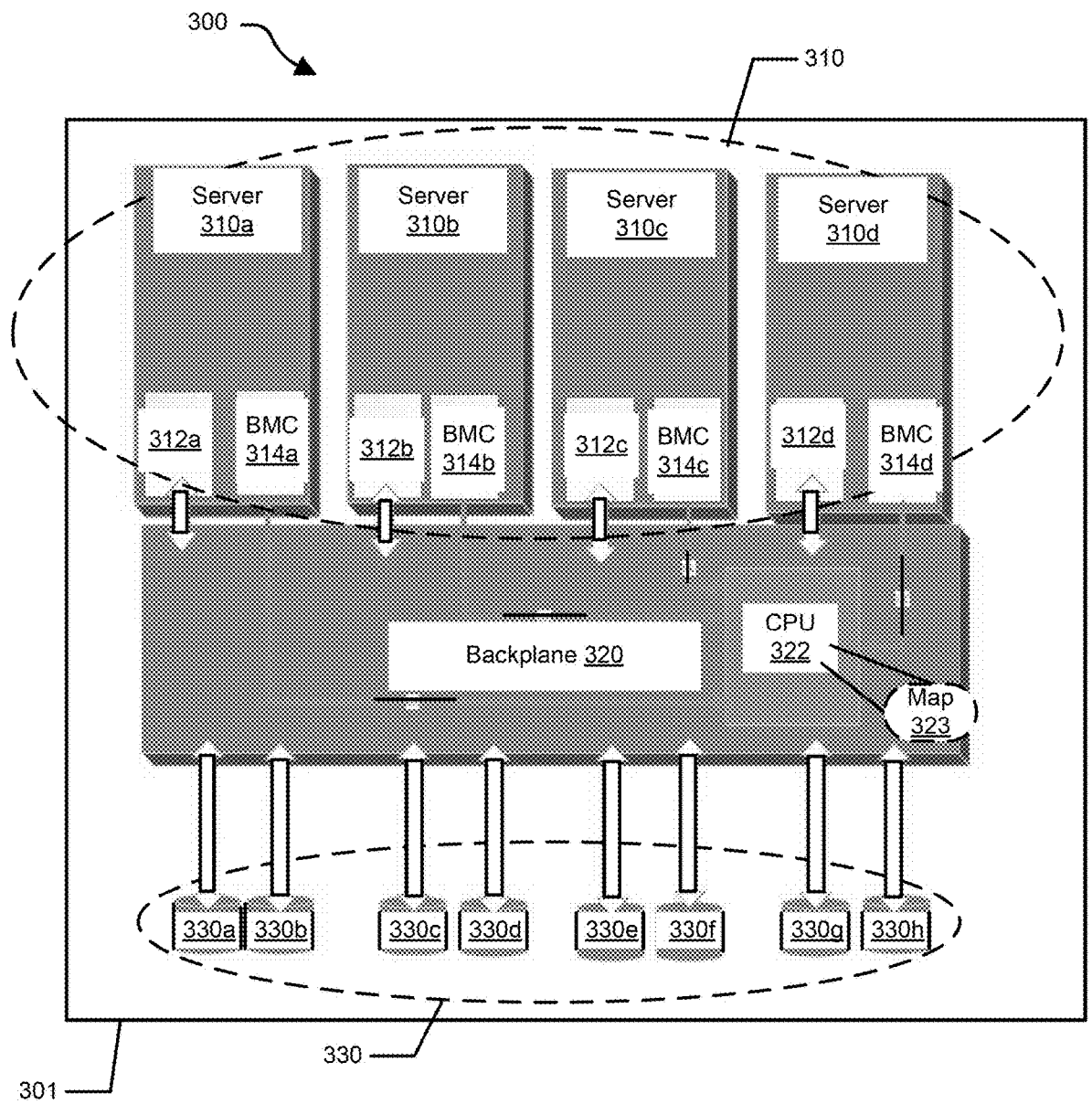
FIG. 3 illustrates a chassis storing multiple information handling systems according to an embodiment of the present disclosure.

FIG. 3 shows a blade server 300 storing a set of server blades 310 and a set of memory devices 330. Blade server 300 includes a chassis 301 defining a physical footprint of blade server 300, and server blades 310 and memory devices 330 are stored within the physical footprint provided by chassis 301. Chassis 301 includes a backplane 320 providing an interface within blade server 300 for server blades 310 and memory devices 330. Backplane 320 includes a backplane CPU 322 which hosts a memory map 323. Backplane 320 may further include backplane circuitry, including memory accessible by CPU 322 which may store memory map 323. Memory map 323 may delineate the allocation or zoning of memory devices 330 among server blades 310.

Each of server blades 310 includes a respective storage controller 312 and BMC 314. For example, server blade 310a includes storage controller 312a and BMC 314a. A server blade 310 may further include a server CPU connected to the storage controller (not shown). Each storage controller 312 is connected to and interfaces with backplane 320 over a respective connection which may be a serial bus which may provide a channel for communications between storage controller 312 and backplane 320 according to a communication protocol such as the SAS protocol. Each BMC 314 is connected to and interfaces with CPU 322 over a respective connection which may be a serial bus which may provide a channel for communications between BMC 314 and CPU 322 according to a communication protocol such as the IIC protocol.

Furthermore, each memory device 330 is connected to and interfaces with backplane 320 over a respective connection which may be a serial bus which may provide a channel for communications between storage controller 312 and memory device 330 according to a communication protocol such as the SAS protocol. In operation of blade server 300, CPU 322 may implement a switch between server blades 310 and memory devices 330 over backplane 320. More particularly, CPU 322 may implement a switch connecting server blades 310 and memory devices 330 such that server blades 330 may use memory devices 330 for data storage.

Each of server blades 310 may be allocated one or more memory devices 330 exclusive of other server blades 310 for use as data storage and may interface with its allocated memory devices over backplane 320 according to a communication protocol. For example, server blade 310a may be allocated memory devices 330a and 330b and have access to memory devices 330a and 330b exclusive of other server blades 310b-310d. That is, server blade 310a may have sole access to its allocated memory devices 330a and 330b for data storage such that server blades 310b-310d are precluded from using memory devices 330a and 330b allocated to server blade 310a. Backplane 320 may be passive with regard to physically allocating or partitioning memory devices 330 across the server blades 310. That is, backplane 320 may lack the capability to partition and allocate memory devices 330 to server blades 310, and thus server blades 310 may partition and allocate the memory devices 330 among server blades 310.

Server blades 310 partition and allocate the memory devices 330 among server blades 310 by arbitrating among themselves to designate a master server blade which performs the partitioning and allocating of memory devices 330 among server blades 310. This partitioning and allocating of the memory devices 330 among server blades 310 may be performed at a reset or power cycle of blade server 300 such that the partition and allocation of memory devices 330 among server blades 310 is generally static during normal operation of blade server 300. CPU 322 and memory map 323 hosted by CPU 322 may be leveraged to implement arbitration among server blades 310 to designate a master server blade which performs the partitioning and allocating of the memory devices 330 among server blades 310.

The designation of master server blade may be transitory or temporary, and timeout after lapse of a temporal period such that server blades arbitrate among themselves to designate a master server blade for each partitioning and allocating of the memory devices 330 among server blades 310. That is, a designated master server blade does not remain the designated master server blade, but after a time period has lapsed, loses its master server blade designation, and a new arbitration among server blades 310 must be performed to designate a master server blade for a further partition and allocation of memory devices 330.

More particularly, each server blade 310 includes a respective BMC 314 connected to CPU 322 by a respective connection which may be an IIC bus. The BMCs 314 of server blades 310 may arbitrate among themselves to designate a master server blade or BMC which then allocates or partitions memory devices 330 among server blades 310 in a zoning operation in response to a reset or power cycle of blade server 300. Memory map 323 hosted by CPU 322 may be leveraged in arbitrating among server blades 310 to designate the master server blade. Each of BMCs 314 may access memory map 323 hosted by CPU 322 over the respective connection between BMC 314 and CPU 322. The first BMC 314 to access memory map 323 may set one or more zoning control bits or flags in memory map 323 designating itself as the master server blade, and perform a zoning operation which allocates or partitions memory devices 330 among server blades 310 by writing the desired partition of memory devices 330 among server blades 310 to memory map 323.

BMCs 314 subsequently accessing memory map 323 will determine that another server blade is the designated master server blade by reading the set zoning control bits or flags, and access the memory map to determine the allocation and partitioning of memory devices 330 among server blades 310 as allocated by the master server blade. The designation of the master server blade will timeout after a lapse of a temporal period, and the zoning control bits or flags in memory map 323 may be reset. The respective connections between BMCs 314 and CPU 322 may be considered out of band connections because these connections may be distinct from the connections between storage controllers 312 and memory devices 330 to backplane 320 which may use SAS connections for data transfer between storage controllers 312 and memory devices 330. That is, the connections between BMC 314 and CPU 322 may be out of band relative to the connections between storage controllers 312 and backplane 320 and memory devices 330 and backplane 320.

For example, the designation of master server blade may be reset after a lapse of time in memory map 322 hosted by CPU 322. Further, blade server 300 may undergo a power cycle. Subsequent to the power cycle of blade server 300, it may be desirable to allocate memory devices 330 among server blades 310 and this allocation may be performed by server blades 310. Server blades 310 arbitrate among themselves to designate a master server blade 310 which will perform the allocation by each respective BMC 314 of server blades 310 accessing memory map 323; if BMC 314a accesses memory map 323 first, BMC 314a sets one or more control bits or flags in memory map 323 indicating a master server blade 310a has been designated, in this case, server blade 310a. By setting these control bits or flags, BMCs subsequently accessing memory map 323 will read the set control bits or flags and determine that a master server blade has been designated such that they are precluded from being the master server blade.

Subsequent to designating itself the master server blade, server blade 310a performs a zoning operation, partitioning or allocating memory devices 330 among server blades 310 and recording this allocation in memory map 323. For example, BMC 314a may allocate memory devices 330a and 330b to server blade 310a, memory devices 330c and 330d to server blade 310b, memory devices 330e and 330f to server blade 310c, and memory devices 330g and 330h to server blade 310d, and record this memory device allocation in memory map 323.

Subsequently, when BMCs 314b-314d access memory map 323 as part of the arbitration procedure, BMCs 314b-314d will read one or more control bits or flags in memory map 323 indicating a master server blade 310 has been designated, and know a master server blade has been designated and a zoning operation performed allocating memory devices 330 among server blades 310. BMCs 314b-314d will then read the allocation of memory devices 330 among server blades 310 in memory map 323 and thus be made aware of memory devices 330 allocated to their respective server blades 310b-310d. For example, when BMC 314b accesses memory map 323 and determines that a different server blade 310 has been designated as the master server blade for zoning, BMC 314b will read the memory device allocation in memory map 323 and recognize that server blade 310b has been allocated memory devices 330c and 330d, and server blade 310b will use said memory devices 330c and 330d for data storage with storage controller 312b. After a time has lapsed, for example, 60 seconds, the control bits or flags in memory map 323 may be reset, indicating a master server blade is no longer designated.

Figure 4:
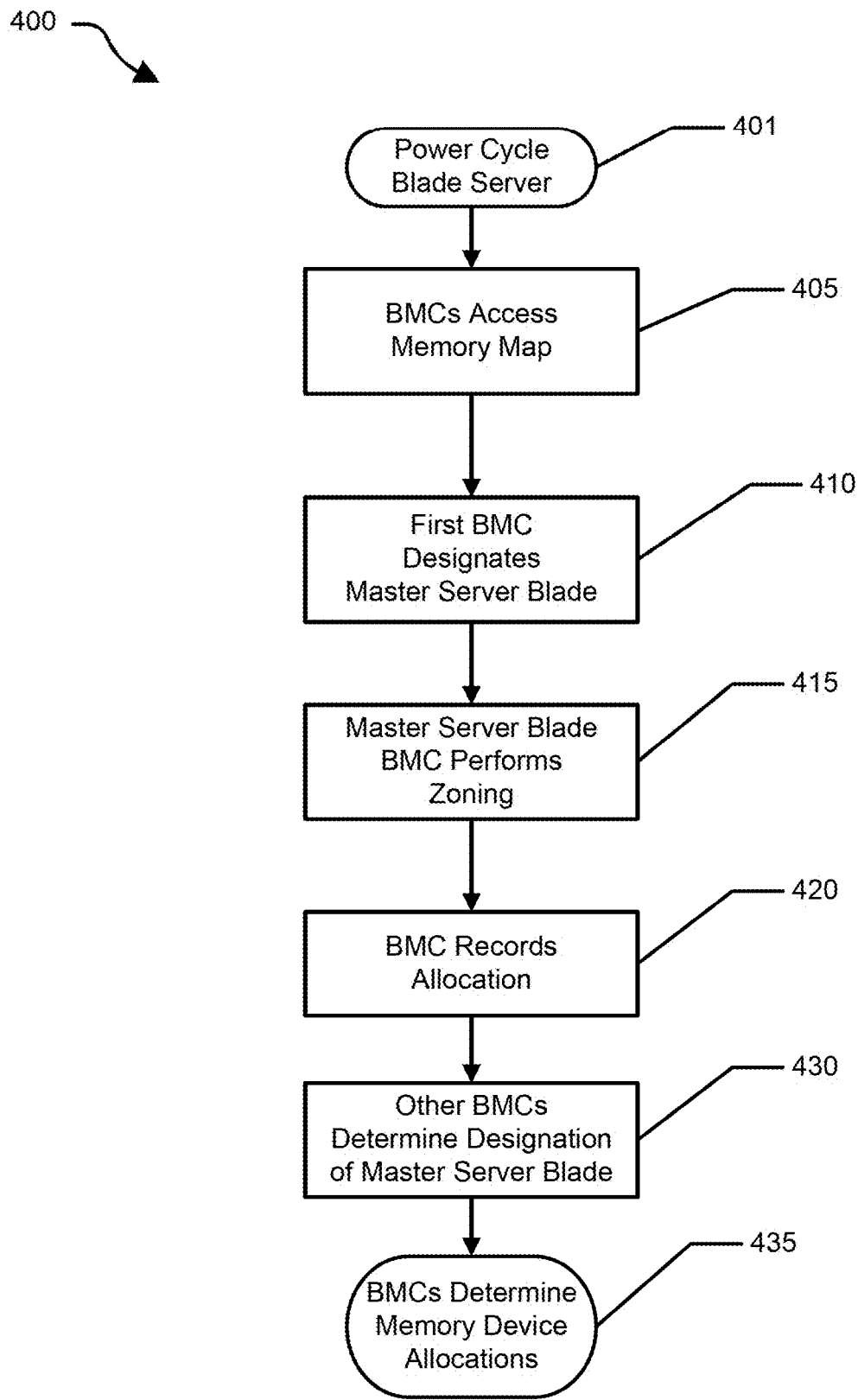
FIG. 4 illustrates a flowchart for memory device allocation among information handling systems stored in a chassis.

FIG. 4 shows a flowchart 400 illustrating arbitrating among server blades and zoning allocating memory devices among server blades. At 401, a blade server storing multiple server blades and multiple memory devices undergoes a power cycle or reset. At 405, respective BMCs of the stored server blades access a memory map hosted by a CPU of the backplane of the blade server over respective connections with the CPU. At 410, the first BMC to access the memory map designates its respective server blade as the master server blade. For example, the BMC may set one or more bits in the memory map indicating a master server blade has been designated. At 415, the BMC of the master server blade performs zoning, allocating the memory devices among the server blades. For example, different memory devices may be allocated to different server blades for use as data storage by said server blades. Two memory devices might be allocated to one server blade, while a different two memory devices might be allocated to a different server blade. At 420, the BMC of the master server blade writes the memory device allocation to the memory map.

At 430, other BMCs accessing the memory map determine that a master server blade has been designated. For example, the other BMCs may read one or more bits in the memory map indicating that a master server blade has been designated. Subsequently at 435, the other BMCs read the memory map and determine the memory devices allocated to their respective server blade, and 400 terminates.

Systems and embodiments described herein may allow for arbitration among seven server blades and allow for eight zoning configurations with different memory device allocation among the server blades. In order to ensure that a single BMC may have access to write to the memory map, the BMCs may use a mutex (mutually exclusive) thread or function to access the memory map such that writing to the memory map may be limited to the first BMC to access the memory map.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A blade server comprising:
   a set of two or more server blades, each server blade including a server; and
   a set of two or more memory devices connected to a backplane, wherein the backplane includes a CPU and the CPU hosts a memory map including a control bit that indicates whether a temporary master server blade has been designated, and wherein:
   the server blades arbitrate among themselves to designate one of them as the temporary master server blade by leveraging the memory map, wherein a first one of the server blades to access the memory map sets the control bit designating itself the temporary master server blade; and
   subsequent to designating itself the temporary master server blade, the temporary master server blade allocates the memory devices to the server blades in a zoning procedure and different server blades are allocated different memory devices.

2. The blade server of claim 1, wherein each server blade includes a respective BMC and a respective storage controller, and the respective BMC and the respective storage controller are connected to the backplane.

3. The blade server of claim 2, wherein respective BMCs are connected to the CPU with respective BMC to CPU connections and the respective BMCs access the memory map.

4. The blade server of claim 3, wherein a first respective BMC of a first server blade sets the control bit.

5. The blade server of claim 4, wherein subsequent respective BMCs accessing the memory map read the set control bit and determine the temporary master server blade has been designated.

6. The blade server of claim 5, wherein the first respective BMC allocates the memory devices to the server blades and records the allocation of the memory devices to the server blades in the memory map.

7. The blade server of claim 6, wherein the subsequent respective BMCs read the memory map to determine the allocation of the memory devices to the server blades.

8. The blade server of claim 3, wherein the BMC to CPU connections are out of band relative to storage device and memory controller connections to the backplane.

9. An information handling system comprising:
   a chassis including a backplane, wherein the backplane includes a CPU, and the CPU hosts a memory map including a control bit to indicate a temporary master server has been designated;
   a plurality of servers connected to the backplane; and
   a plurality of memory devices connected to the backplane, wherein:
   the servers arbitrate among themselves to designate one of them as the temporary master server by leveraging the memory map, wherein a first server to access the memory map sets the control bit designating itself the temporary master server; and
   subsequent to designating itself the temporary master server, the temporary master server allocates the memory devices to the servers in a zoning procedure and different servers are allocated different memory devices.

10. The information handling system of claim 9, wherein each server includes a respective BMC and a respective storage controller, and the respective storage controller is connected to the backplane to access allocated memory devices over the backplane.

11. The information handling system of claim 10, wherein respective BMCs are connected to the CPU with respective BMC to CPU connections and the respective BMCs access the memory map.

12. The information handling system of claim 11, wherein the BMC to CPU connections are out of band relative to storage device and memory controller connections to the backplane.

13. The information handling system of claim 12, wherein the first server includes a first respective BMC, and wherein the access to the memory map is limited to the first respective BMC.

14. The information handling system of claim 13, wherein subsequent respective BMCs accessing the memory map read the set control bit and determine the temporary master server has been designated.

15. A method comprising:
   arbitrating by a plurality of server blades to designate one of them as a temporary master server blade by leveraging a memory map, wherein a first server blade of the server blades to access the memory map sets a control bit designating itself the temporary master server blade, and wherein the access to the memory map is limited to the first server blade; and
   subsequent to designating itself the temporary master server blade, allocating a plurality of memory devices respectively to each of the server blades in a zoning procedure performed by the temporary master server blade.

16. The method of claim 15, wherein each server blade includes a respective BMC.

17. The method of claim 16, wherein respective BMCs access the memory map over an out of band connection.

18. The blade server of claim 4, wherein the respective BMCs access to the memory map is mutually exclusive.

19. The blade server of claim 1, wherein the servers are in a chassis.

20. The blade server of claim 1, wherein the allocation of the different memory devices is such that a server blade has exclusive access to its allocated memory devices.

* * * * *